United States Patent
Malvar et al.

(10) Patent No.: US 7,382,820 B2
(45) Date of Patent: Jun. 3, 2008

(54) SPREAD SPECTRUM MODULATION SYSTEM AND METHOD FOR EMBEDDING DIGITAL INFORMATION INTO DIGITAL OR ANALOG MEDIA

(75) Inventors: Henrique Malvar, Sammamish, WA (US); Dinei Florencio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 10/865,690

(22) Filed: Jun. 10, 2004

(65) Prior Publication Data
US 2004/0240524 A1   Dec. 2, 2004

Related U.S. Application Data

(63) Continuation of application No. 09/654,013, filed on Sep. 1, 2000, now Pat. No. 6,778,587.

(51) Int. Cl.
 *H04B 1/69* (2006.01)
(52) U.S. Cl. .......................................... 375/130; 380/43
(58) Field of Classification Search ................. 375/130; 382/276, 278, 280, 283, 2; 380/203, 223–224, 380/228–229, 239, 44, 46, 43, 277, 268
See application file for complete search history.

(56) References Cited

U.S. PATENT DOCUMENTS

| | | | | |
|---|---|---|---|---|
| 6,061,793 A * | 5/2000 | Tewfik et al. | ............... | 713/176 |
| 6,069,914 A * | 5/2000 | Cox | ........................... | 375/150 |
| 6,222,932 B1 * | 4/2001 | Rao et al. | .................... | 382/100 |
| 6,259,801 B1 * | 7/2001 | Wakasu | ...................... | 382/100 |
| 6,320,965 B1 * | 11/2001 | Levine | ........................ | 380/34 |
| 6,415,041 B1 * | 7/2002 | Oami et al. | ................. | 382/100 |
| 6,901,514 B1 * | 5/2005 | Iu et al. | ...................... | 713/176 |

\* cited by examiner

*Primary Examiner*—Khanh C Tran
(74) *Attorney, Agent, or Firm*—Lyon & Harr, LLP; Richard T. Lyon

(57) ABSTRACT

A system and method for embedding information into digital media and later detecting the embedded information using a unique spread spectrum modulation technique. In general, the present invention removes interference caused by an original signal from the detection process thereby eliminating a major source of detection error. The interference caused by the original signal is removed by using the encoder knowledge about the original signal and modulating the energy of the embedded mark to compensate for the original signal interference. The present invention also includes a novel redundant bit representation technique causes a resulting average over a large sample to tend to zero, thereby reducing the vulnerability of the present invention to malicious collusion attacks.

15 Claims, 6 Drawing Sheets

SPREAD SPECTRUM MODULATION SYSTEM AND METHOD FOR EMBEDDING DIGITAL INFORMATION INTO DIGITAL OR ANALOG MEDIA

CROSS-REFERENCE TO RELATED APPLICATIONS

This application is a continuation of a prior application entitled "Spread Spectrum Modulation System And Method For Embedding Digital Information Into Digital Or Analog Media" which was assigned Ser. No. 09/654,013 and filed Sep. 1, 2000 now U.S. Pat. No. 6,778,587.

BACKGROUND OF THE INVENTION

1. Field of the Invention

The present invention relates in general to a system and method for digitally embedding information and, in particular, to a system and method for embedding digital information into digital or analog media and later detecting the embedded information using spread spectrum modulation.

2. Related Art

Embedding digital information into a digital or analog media has many important applications including counterfeiting reduction. For example, copyright information may be hidden within a digital signal (such as an image, video or audio), distributed with the digital signal and then later detected to ensure authenticity. The technique of embedding information within a work in a way that is not immediately perceptible and is hard to reproduce (also called "watermarking") has been used for centuries in applications such as documents and currency. In current times, the widespread digital representation of images, audio, video and other signals has led to the use of a "digital watermark" for copyright protection. This marking of digital media involves hiding information under an original signal by embedding (or adding) an imperceptible signal (the mark) to the original signal.

Most marking techniques use existing spread spectrum modulation techniques to modulate information (the mark) and embed the mark within an original signal. For example, the bits composing the desired mark (such as the name of the copyright owner) are modulated using a spread spectrum sequence and added to the original signal (such as a musical work in digital form). More often, the spread spectrum sequence is added to a transformation of the original signal, which may be more sensitive to manipulation. Typically, these existing spread spectrum modulation techniques are robust to interfering noise so that the amount of energy (or distortion) that must be added to the marked signal to erase the mark is quite high. This means that it is difficult remove the mark from the original signal.

In existing spread spectrum techniques, the original signal (also known as a carrier signal) is seen as a source of noise. One problem with these existing techniques is that, as a source of noise, the original signal tends to interfere with the detection of the mark and reduce the mark detection accuracy. This is particularly a problem because the original signal is generally much stronger than any other interference and therefore is the main source of interference.

One embedding technique that uses quantization index modulation does reduce interference from the original signal. The problem, however, with this technique is that the mark is embedded in a lattice, which makes the mark highly sensitive to amplitude scaling of the signal. In other words, a slight change in the scale of the marked signal causes the mark to be erased. This makes the quantization index modulation technique practically useless in applications where a malicious attack may occur.

What is needed is a system and method for embedding information into a digital media that removes the original signal as a source of interference and obtains a large gain accurately detecting the mark within the marked digital media. In particular, the system and method would subtract the influence of the original signal from the mark thereby virtually eliminating a large portion of the interference. Elimination of this interference would greatly decrease error in the mark detection rate and greatly increase performance. In addition, the marking system should be robust and insensitive to amplitude scaling and other forms of malicious attacks. Whatever the merits of the above-mentioned systems and methods, they do not achieve the benefits of the present invention.

SUMMARY OF THE INVENTION

To overcome the limitations in the prior art as described above and other limitations that will become apparent upon reading and understanding the present specification, the present invention is embodied in a system and method for embedding digital information into digital or analog media and later detecting the embedded information using a unique spread spectrum modulation technique. The novel spread spectrum modulation technique is capable of removing any carrier signal interference from the modulation. In particular, the present invention subtracts part or all of the interference from the original signal before transmission of a marked signal to enable superior detection of any information embedded in the received signal.

The present invention provides several advantages that improve reliability over current spread spectrum techniques for embedding and detecting information in digital media. In particular, unlike traditional spread spectrum techniques, in the present invention the carrier signal does not act as a noise source because the carrier signal interference is removed beforehand from the received signal. This permits the present invention to achieve significant performance improvements over traditional spread spectrum techniques. Improved performance afforded by the present invention greatly reduces the instances of misdetection of the embedded information. In addition, the present invention maintains the robustness of traditional spread spectrum techniques while achieving higher noise robustness gain and provides security against malicious attacks.

In general, the method of the present invention obtains a received signal on which information is to be embedded. The present invention then obtains information about the expected interference from the original signal upon a watermark detector. The present invention then removes all or part of this interference while simultaneously embedding the desired mark within the signal. Estimation of the amount of watermark signal to embed or remove is performed using a generic function that minimizes the probability of error in the detection of the embedded information. In one embodiment of the invention, the generic function is approximated as a linear function and in an alternate embodiment the generic function is a non-linear function. Moreover, distortion parameters may be introduced in this generic function to control distortion levels. Other enhancements are included within the present invention such as, for example, the introduction of a small randomization into the distortion parameters to provide a more secure detection method.

The present invention also includes a method of reducing the vulnerability of unwanted embedded information removal. In particular, the present invention includes a novel redundant bit representation technique causes a resulting average over a large sample to tend to zero. In a preferred embodiment, the present invention inserts an "invert" bit having a 50% probability to indicate the need to invert any remaining bits. Several other redundant representations may be used with this method to achieve similar results. The present invention also includes a system of embedding and detecting information in digital media that utilizes the methods of the present invention.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Exemplary Operating Environment

Figure 1:
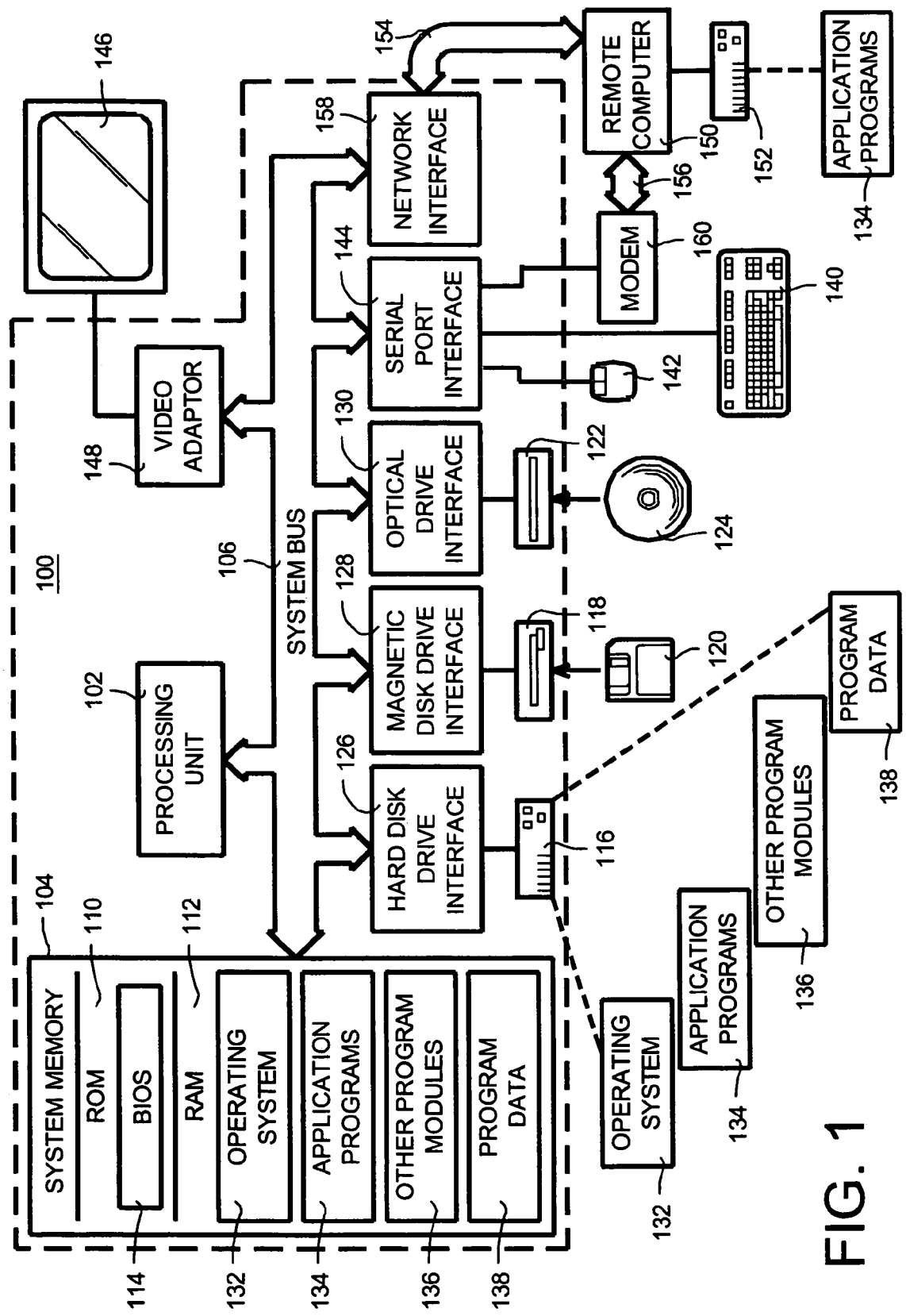
FIG. 1 is a block diagram illustrating an apparatus for carrying out the present invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD-ROM or other optical media. The hard disk drive 116, magnetic disk drive 118 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital-video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142 as well as other input devices (not shown) including, for example, a microphone, joystick, game pad, satellite dish, scanner, or the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

II. Introduction

Spread spectrum is a communication technique that uses wide band, noise-like signals. Because spread spectrum signals resemble noise, they are hard to detect, difficult to interfere with and hard to decode. In general, spread spectrum includes a transmission station having an encoder that encodes data to produce an intermediate signal having a relatively narrow bandwidth centered around a certain frequency. In order to increase the bandwidth of the signal transmitted, this intermediate signal is modulated using a sequence of pseudorandom numbers created by an algorithm. The transmission station shares the algorithm with a receiving station because, unless the algorithm is known, the sequence is virtually impossible to predict. Upon reception by the receiving station, the same pseudorandom sequence created by the known algorithm is used to demodulate the spread spectrum signal and a decoder is used to recover the encoded data.

The present invention includes an embedding system and method that removes interference caused by the original signal from the detection process. Using a unique spread spectrum modulation technique, the present invention virtually eliminates distortion caused by the original signal, thereby improving performance. The interference caused by the original signal is removed by using the encoder knowledge about the original signal and modulating the energy of the embedded mark to compensate for the original signal interference. This unique spread spectrum modulation technique provides exceptional improvement over existing spread spectrum techniques and may be readily implemented within most marking systems using spread spectrum, thereby providing improved performance.

The method and system of the present invention includes several embodiments that may be used depending on the application. More specifically, one embodiment includes a novel spread spectrum modulation technique that uses a linear generic embedding function. This linear approximation reduces the embedding complexity while still providing significantly improved detection of the mark over present spread spectrum techniques. Another embodiment of the present invention limits the distortion level to a desired distortion level by removing the influence of the original signal x from the detection over a pre-defined range of the original signal x. Still another embodiment does not restrict the generic embedding function to a linear function. This nonlinear embodiment is more complex and more generic that the linear approximation embodiment. Moreover, the present invention includes a redundant bit representation technique that is implemented so that a resulting average of marks tends to zero when several original signals are averaged together.

III. General Overview

The present invention is embodied in a system and method for embedding digital information into digital or analog media and later detecting the embedded information using spread spectrum modulation. Embedding the desired information includes removing an original signal (such as a digital sound, video or image file) as a source of interference to improve the detection process. The original signal is known to the encoder but is generally treated as a source of interference. Removing the interference from the original signal (using the method of the present invention described herein) produces a dramatic improvement in the detection of the embedded information. The detection technique of the present invention uses spread spectrum modulation and knowledge about the original signal to enhance detection performance by modulating the energy of the embedded information to compensate for the interference of the original signal.

Figure 2A:
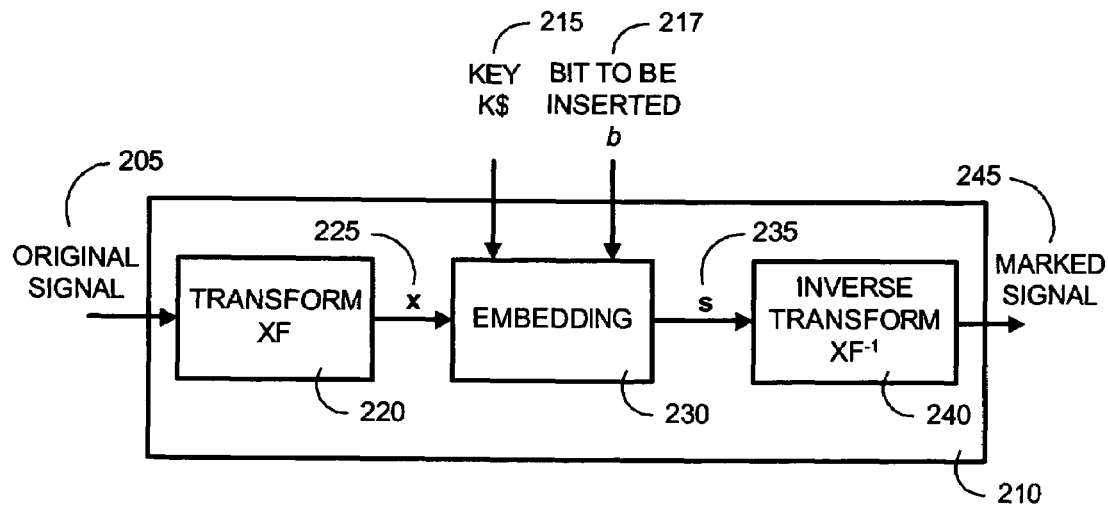
FIG. 2A is a general block diagram illustrating an embedding system and method in accordance with the present invention.

FIGS. 2A and B are general block diagrams illustrating a system and method for embedding digital information into digital or analog media in accordance with the present invention. In general, the system and method of the present invention includes embedding digital information into digital or analog media and later detecting that embedded information. The embedded information can be a series of bits that, when embedded into an original signal, provide a unique and discrete stamp (or mark) on the original signal that, for example, may provide copyright owner information about the original signal. Embedded information is added under the original signal (the original signal is "marked") such that the embedded information is difficult to detect and virtually imperceptible except to a detector.

A general system and method for an embedding portion of spread spectrum-based watermarking is shown in FIG. 2A. In particular, an original signal 205 is received by an embedder 210. An embedder transform process 220 is applied to the original signal 205. As discussed in detail below, the embedder transform process 220 converts the original signal 205 to a domain more appropriate to the watermark insertion. The embedder transform process 220 produces a transformed signal x 225 which is input to an embedding process 230. The embedding process 230 receives as input the transformed signal x 225, a secret key 215 (K$), and a bit to be inserted (or information) b 217. Next, the embedding process 230 produces an output signal s 235 that is then passed on to an inverse transformation process 240. The inverse transformation process 240, which performs the inverse transformation of the embedder transform process 220, produces a watermarked signal 245. The watermarked signal 245 is similar to the original signal 205 except that the watermarked signal 245 contains the information b hidden in the watermarked signal 245.

Figure 2B:
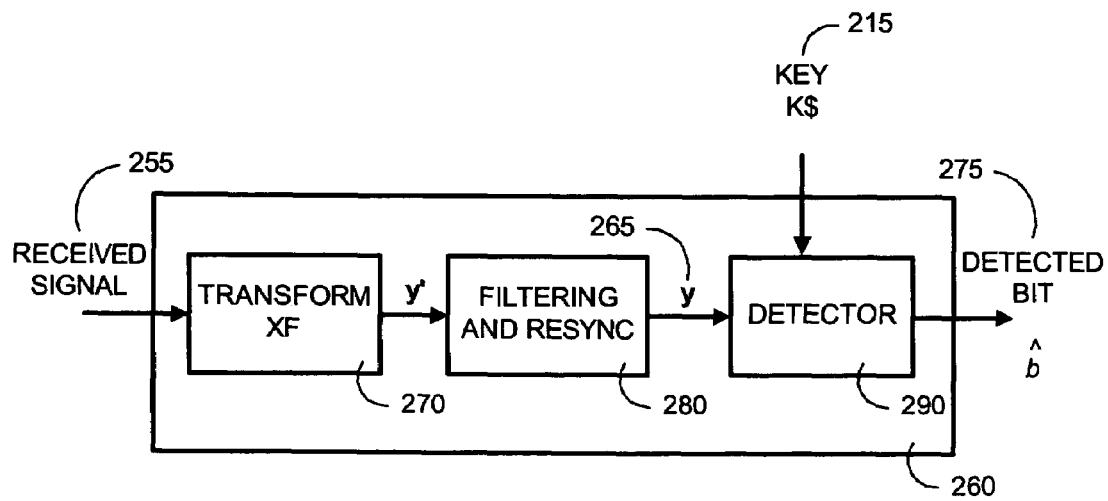
FIG. 2B is a general block diagram illustrating a detecting system and method in accordance with the present invention.

A general system and method for a detecting portion of spread spectrum-based watermarking is shown in FIG. 2B. A detector 260 receives a received signal 255 (which may differ slightly from the watermarked signal 245 due to channel noise, compression, or attack noise) and uses the present invention to obtain a signal y 265 that is as close to the output signal s 235 as possible. This includes applying a detector transformation process 270 (which may be similar or identical to the embedder transform process 220) and a filtering and re-syncing process 280, which removes or reduces any eventual noise added to the signal or shifts that may have occurred. Based on the signal y 265, a detection process 290 verifies the presence of the mark and detects a transmitted bit $\hat{b}$ 275. In order to achieve this detection, the detection process 290 generally makes use of a copy of the secret key K\$ 215. Ideally, the watermarked signal 245 is indistinguishable from the original signal 205, but the mark can be detected and decoded by the detector 260 even if the watermarked signal 245 is processed or otherwise modified.

In general, the embedder transform process 220 represents a transform from an original signal domain to a domain where the data is more equally sensitive to tampering. Ideally, this "good transform" also removes any part of the data that is not perceptually significant. In the case of images, for example, the transform should be virtually insensitive to translation, small contrast manipulations, low-pass filtering, and other common signal processing techniques. The idea is that, after the transform, any significant change in the signal would significantly impair the image. It should be noted that although a box with the inverse transformation process 240 is included, the transform does not need to strictly be invertible because some side information can be passed from the original signal to the inverse transform.

In general, the contents and design of boxes 220, 240, 270 and 280 have been widely investigated and hundreds of examples exist in the literature. In most of these cases, box 230 is implemented by simply adding a spread spectrum modulated watermark to the signal and box 290 is implemented as simply a spread spectrum detector. The improved spread spectrum system and method of the present invention address mainly the implementation of the embedding process 230. In fact, the present invention may be implemented readily into most of these hundreds of watermarking schemes by adopting whichever implementation of boxes 220, 240, 270 and 280. Moreover, in many cases even the detection process 290 may be imported directly from existing spread spectrum watermarking systems.

Consequently, the remainder of this application will consider the transformed signal x 225 as the original signal. In addition, the net effect of channels and attack noises combined with the effect of boxes 240, 270 and 280 will be considered and will be denoted as channel/attack noise n. In other words, channel/attack noise will be defined as the part of the noise that was not canceled out by the processes of boxes 240, 270 and 280.

IV. General Operation of the Invention

Figure 3:
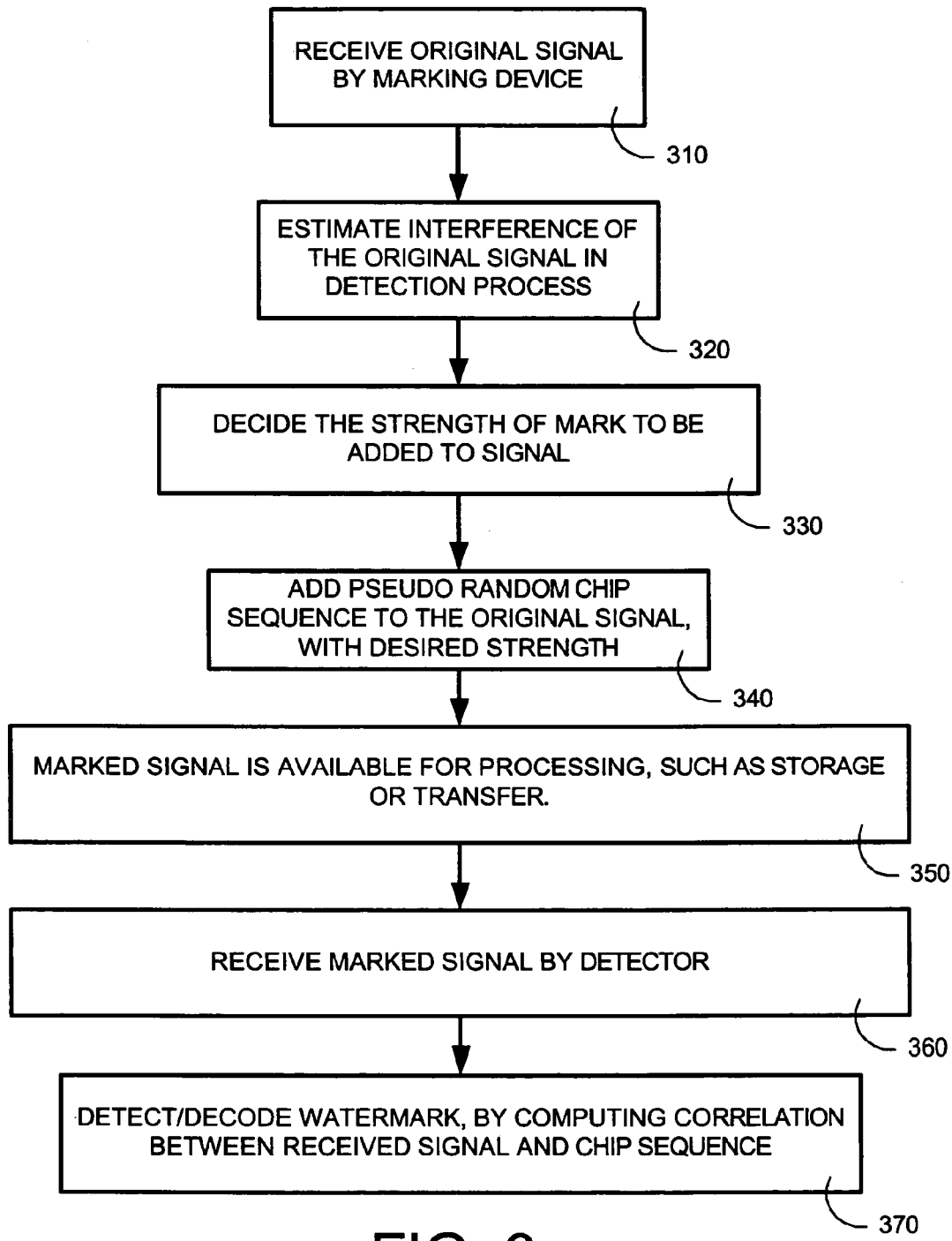
FIG. 3 is a general flow diagram of a digital embedding method of the present invention.

FIG. 3 is a general flow diagram of a digital embedding method of the present invention. In general, the present invention includes an encoder for embedding a mark in to an original signal, and a detector for detecting the mark within a received signal. The encoder includes having the original signal received by a marking device (box 310), estimating the interference that this particular signal would have in the detection process (box 320), and using this information to decide about the strength (i.e., amplitude) of the mark to be added to the signal (box 330), and then adding a mark (for example a pseudo random chip sequence) to the original signal (box 340). A marked signal, which includes the mark embedded into the original signal, is then available for further processing (box 350). This processing may include, for example, storage in a within a storage media and transfer (such as transmission over a network).

The detector of the present invention receives the marked signal (box 360), and proceeds to detect and decode the watermark by computing a correlation measure between the received signal and the chip sequence (box 370). By using information about the original signal available at the encoder, the novel system and method of the present invention is able to reduce the probability of error in the detection of the mark and provides improved performance over existing spread spectrum modulation techniques.

V. Details of the Invention and Working Example

The present invention includes several embodiments that utilize a unique spread spectrum modulation technique that removes the influence of the original signal from the detection process. More specifically, knowledge about the original signal from the encoder is used to remove the original signal during the detection process, thereby greatly improving performance. The following discussion provides details working examples of these embodiments of the present invention.

Figure 4:
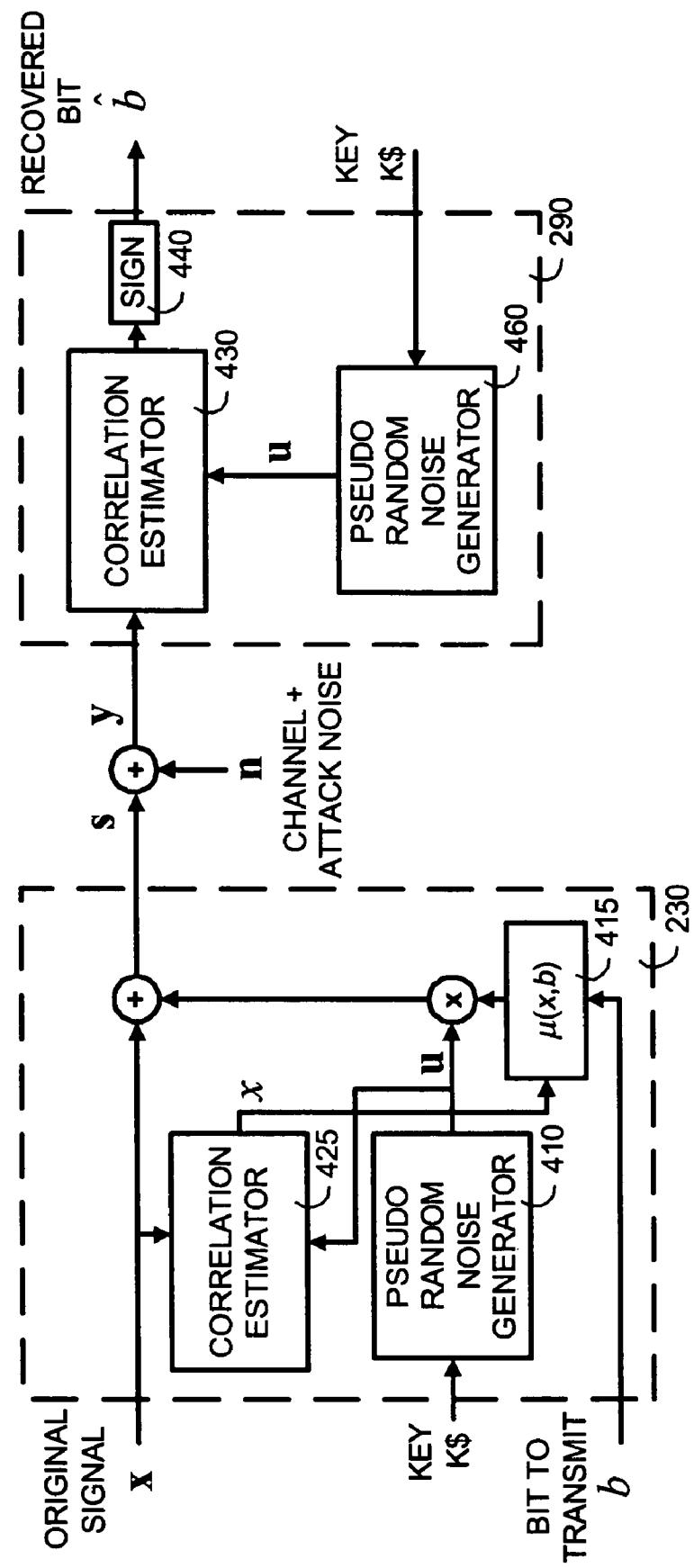
FIG. 4 is a detailed block diagram illustrating a working example of FIGS. 2 and 3 of the present invention.

FIG. 4 is a detailed block diagram illustrating a working example of FIGS. 2 and 3 of the present invention. In FIG. 4, block 230 represents the embedder encoder or watermark inserter), while block 290 represents the detector (decoder or watermark detector). In this working example, information is embedded and detected in accordance with the unique spread spectrum modulation technique of the present invention. In general, the present invention obtains an original signal x (such as samples of a music, or coefficients of a transform of a segment of that music) and embeds imperceptible information into the original signal x for marking purposes. As shown in FIG. 4, the information preferably is generated using a pseudo-random number generator (PRN) 410 and a secret key K\$. This secret key is known by both the encoding process and the detection of the present invention.

A unique and discrete mark (information or "chip sequence") u is produced from the secret key K\$ and the PRN 410. An encoding bit b, which determines whether the chip sequence u is added or subtracted to the original signal x, is provided to the encoder 230 and encoded as part of the marking process. An amplitude embedding regulator 415 decides the strength of the sequence to be inserted in the signal. As explained in detail below, the present invention includes several embodiments of the unique spread spectrum modulation technique to modulate the amplitude of the embedded chip sequence to compensate for interference of the original signal. In a general form, the amplitude μ of the embedded chip sequence will be a function of the bit to be transmitted b, and the correlation between the original signal x and the chip sequence u, this correlation is denoted herein by x, and which is computed by a correlation estimator 425. The final result of the process is a marked signal s, which is then sent to the receiver. Before the signal reaches the detector noise n (such as channel noise or attack noise) may be added to the marked signal s, and will generally increase the probability of error in detecting b.

The decoder 290 shown in FIG. 4 determines the transmitted bit b embedded in the signal by verifying the sign of the discrete mark (in the form of the chip sequence u) contained within marked signal s. In the present invention, this is done in a manner similar to traditional spread spectrum (i.e. by computing a correlation measure between the received signal y and the chip sequence u, and evaluating the sign of this correlation). This is done in FIG. 4 by first computing the correlation between y and u at a correlation detector 430, and taking the sign of the result in a sign detector 440. As will be explained in the mathematical description that follows, this is equivalent to evaluating the sign of the sufficient statistic r. The chip sequence u is obtained by using the secret key K$ and a copy of a number generator 460, which is a copy of the number generator used by the encoder 230. In case the embedded watermark consists of more than one bit, the process is repeated for each segment of the sequence u corresponding to each bit of the watermark, as in a traditional spread spectrum technique.

The mathematical details of FIG. 4 will now be discussed. In particular, the chip sequence u produced by the secret key K$ and the PRN 410 has a zero mean and elements that are equal to $+s_u$ or $-s_u$. This chip sequence u is then added or subtracted to the original signal x according to the encoding bit b, where b is equal to either $+1$ or $-1$. The encoding bit b is transmitted with the marked signal s.

An analysis of spread spectrum modulation as applied to embedding information into digital media leads to a formula for a probability of error. Initially, the inner product and norm are defined as:

$$\langle x, u \rangle \triangleq \frac{1}{N} \sum_{i=0}^{N-1} x_i u_i, \text{ and } \|x\| \triangleq \langle x, x \rangle,$$

where N is the length of the vectors x, u, s, n, and y as shown in FIG. 4. An assumption is made that one bit of information is being embedded into the marked signal s having N transform coefficients. In this case, the bit rate is 1/N bits/sample. The bit is represented by the encoding bit b, whose value is variable and may be either $-1$ or $+1$. Whenever more than 1 bit is to be transmitted, the signal can be divided up into as many parts as bits to be transmitted. Therefore, and without loss of generality, only the one bit case is considered in this analysis.

The present invention embeds the encoding bit b by adding the chip sequence u to the original signal x while modulating the energy of the inserted chip sequence u to compensate for interference from the original signal x. Specifically, the present invention varies the amplitude of the embedded chip sequence u by a generic embedding function $\mu(x,b)$, where, $x \triangleq \langle x,u \rangle / \langle u,u \rangle$. As discussed further below, this generic embedding function $\mu$ may be linear or nonlinear and the general idea is to find a generic embedding function $\mu$ that minimizes the error of the encoding bit. In other words, a generic embedding function is found that improves improve error probability that the mark will be detected.

The embedding process of the present invention may be represented by:

$$s = x + m(x,b)u,$$

where, $x \triangleq \langle x,u \rangle / \langle u,u \rangle$. Note the distinction between the real-valued variable x and the vector x. The present invention includes several embodiments of this novel embedding technique that are discussed in detail below.

Traditional Spread Spectrum Approximation for the Embedding Function

For comparison reasons, the probability error of the embedding process when using the traditional Spread Spectrum Modulation is first analyzed. This corresponds to approximating the embedding function by a constant (i.e., by making $\mu = b$). The associated probability error is analyzed as follows.

A distortion D in the marked signal s is defined by $\|s-x\|$. This leads to a distortion for the above embedding process of, $$D = \|bu\| = \|u\| = s_u^2.$$

The channel model may be represented as $$y = s + n.$$

The present invention detects the embedded information (the chip sequence u) within the marked signal s by first computing a (normalized) sufficient statistic r.

$$r \triangleq \langle y,u \rangle / \langle u,u \rangle = \langle bu+x+n,u \rangle / s_u^2 = b+x+n,$$

and estimating the detected encoding bit by $$\hat{b} = \text{sign}(r),$$

where $x \triangleq \langle x,u \rangle / \langle u,u \rangle$ and $n \triangleq \langle n,u \rangle / \langle u,u \rangle$.

Even though the improvements obtained by the present invention apply to generally any signal and noise distribution, for this mathematical analysis, both the original signal x and the noise n are assumed to be samples from uncorrelated white Gaussian random processes. Therefore, the original signal x and the noise n may be represented as $$x_i \sim N(0, s_x^2), n_i \sim N(0, s_n^2)$$

In this case, the sufficient statistic r is also Gaussian, $$r \sim N(m_r, s_r^2), m_r = E[r] = b \; s_r^2 = (s_x^2 + s_n^2)/N s_u^2.$$

In the case where the encoding bit $b=1$, an error occurs when $r<0$, and so the error probability p is given by:

$$p = Pr\{\hat{b} < 0 \mid b = 1\} = \frac{1}{2}\text{erfc}\left(\frac{m_r}{s_r\sqrt{2}}\right) = \frac{1}{2}\text{erfc}\left(\sqrt{\frac{s_u^2 N}{2(s_x^2 + s_n^2)}}\right)$$

Figure 5:
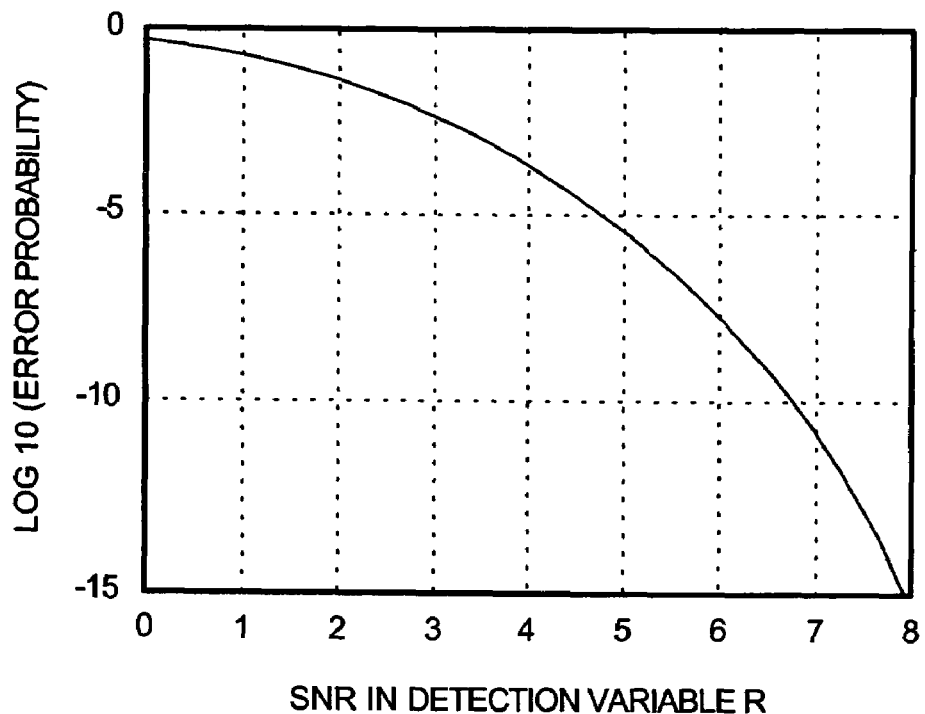
FIG. 5 is a plot of the error probability as a function of the SNR (signal-to-noise ratio) in the detection variable.

The same error probability is obtained under the assumption that the encoding bit $b=-1$. A plot of this probability as a function of the signal-to-noise ratio $m_r/s_r$ is shown in FIG. 5. In general, to achieve an error probability p means that $$Ns_u^2 > 2(erfc^{-1}(p))^2(s_x^2 + s_n^2).$$

The above equation above shows that the length of the chip sequence, N, can be traded with the energy of the sequence $s_u^2$. The equation allows computation of either N or $s_u^2$ given the other variables involved. As an example, as can be seen from FIG. 5, if an error probability better than $10^{-3}$ is desired then we need $$m_r/s_r > 3 \Rightarrow Ns_u^2 > 9(s_x^2 + s_n^2).$$

It should be observed, therefore, that achieving a certain error probability when using traditional spread spectrum requires either increasing the energy of the inserted mark (thereby increasing distortion) or increasing the number of samples used to transmit each bit of the mark (thereby reducing the channel capacity for the mark). The present invention is now analyzed, in which a significant reduction in error rates can be produced when compared with traditional spread spectrum techniques.

Linear Approximation for the Generic Embedding Function

As discussed above, traditional spread spectrum techniques approximate the embedding function $\mu$ by a constant. One way of improving performance of the embedding is to find a generic embedding function $\mu$, for example the one that minimizes the probability of error in the detection of the encoded bit. A preferred embodiment of the present invention uses a linear approximation of the generic embedding function $\mu$. This linear approximation reduces the embedding complexity while still providing significantly improved detection over present spread spectrum techniques. As discussed further below, even when the generic embedding function $\mu$ is approximated as a linear function the performance (such as robustness to noise) of the spread spectrum modulation system and method of the present invention is comparable or superior to other types of spread spectrum techniques.

In this preferred embodiment the generic embedding function $\mu$ is linear and the embedding process of the present invention may be represented as $$s = x + (ab - lx)u$$

A first linear embedding parameter a and a second linear embedding parameter 1 control the distortion level and the removal of the carrier distortion on the detection statistic. It should be noted that traditional spread spectrum techniques are obtained by setting the first and second linear embedding parameters to one and zero (a=1 and 1=0), respectively, as done in the analysis in the previous section.

Using a similar noise model and same notation as above, the receiver sufficient statistic r is $$r = \langle y, u \rangle / \langle u, u \rangle = ab + (1-l)x + n.$$

It should be remembered that the term x represents the influence (interference) of the original signal x on the detection process. This equation shows that the closer the second linear embedding parameter l is to 1, the more the influence of the original signal x will be removed from r. In other words, the closer 1 is to 1 the less influence the original signal magnitude x has on receiver sufficient statistic r. In addition, the detected encoding bit remains unchanged in this linear approximation embodiment and is equal to the sign(r).

The expected distortion of this linear embodiment of the present invention is given by $$E[D] = E[\|s - x\|] = E[|ab - lx|^2 s_u^2] = \left(a^2 + \frac{l^2 s_x^2}{N s_u^2}\right) s_u^2.$$

In order to make the average distortion of this linear embodiment approximately equal that of traditional spread spectrum, the expected distortion is set to $E[D] = s_u^2$, and therefore:

$$a = \sqrt{\frac{N s_u^2 - l^2 s_x^2}{N s_u^2}}$$

Now the error probability may be computed using the mean and variance of the sufficient statistic r. These are given by $$m_r = ab \quad s_r^2 = (s_n^2 + (1-l)^2 s_x^2) / N s_u^2.$$

Using this information, the error probability p for this linear embodiment is computed as $$p = Pr\{\hat{b} < 0 \mid b = 1\} = \frac{1}{2} \text{erfc}\left(\frac{m_r}{s_r \sqrt{2}}\right) = \frac{1}{2} \text{erfc}\left(\sqrt{\frac{N s_u^2 - l^2 s_x^2}{2(s_n^2 + (1-l)^2 s_x^2)}}\right).$$

Alternatively, the error probability p may written as a function of the relative power of the spread spectrum sequence, $N s_u^2 / s_x^2$, and the signal to noise ratio $s_x^2 / s_n^2$.

$$p = \frac{1}{2} \text{erfc}\left(\frac{s_u}{\sqrt{2}} \sqrt{\frac{N s_u^2 / s_x^2 - l^2}{s_n^2 / s_x^2 + (1-l)^2}}\right).$$

Figure 6:
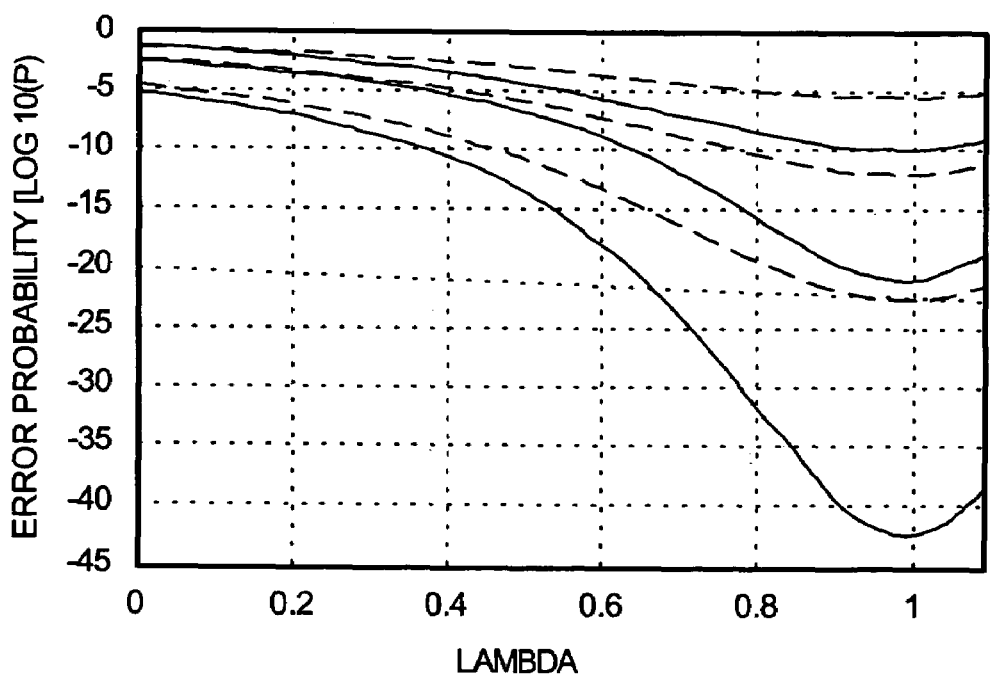
FIG. 6 is a plot of the error probability as a function of the second linear embedding parameter.

FIG. 6 is a plot of the error probability p as a function of the second linear embedding parameter l for various values of the signal-to-noise ration (SNR) and $N s_u^2 / s_x^2$. Solid lines represent a 10 decibel (dB) SNR and dashed lines represent a 7 dB SNR. Each of the three solid and three dashed lines correspond to values of $N s_u^2 / s_x^2$ equal to 5, 10 and 20 (such that higher values of $N s_u^2 / s_x^2$ have smaller error probability). It should be noted that when then the second linear embedding parameter equals zero (l=0) this corresponds to traditional spread spectrum techniques.

FIG. 6 shows that by proper selection of the second linear embedding parameter l, the error probability p for this linear embodiment can be made several orders of magnitude better than traditional spread spectrum techniques. For example, referring to FIG. 6, with a signal to interference ratio of 10 (i.e., 10 dB), there is a reduction in the error rate from $p_0=1.00e-5$ for traditional spread spectrum techniques to $p=1.55e-43$ for the linear embodiment of the present invention. This is a reduction of over 37 orders of magnitude in the error probability. Higher SNR (as is common in practical applications) may yield even higher gains.

As can be inferred from FIG. 6, the error probability varies with l, with the optimum value usually close to one. The expression for the optimum value for l can be computed from the error probability p by setting $\partial/\partial l = 0$, and is:

$$l_{opt} = \frac{1}{2}\left(\left(1 + \frac{s_n^2}{s_x^2} + \frac{N s_u^2}{s_x^2}\right) - \sqrt{\left(1 + \frac{s_n^2}{s_x^2} + \frac{N s_u^2}{s_x^2}\right)^2 - 4\frac{N s_u^2}{s_x^2}}\right).$$

Note also from the above equation that, for N large enough, the optimal value for the second linear embedding parameter approaches one as the SNR approaches infinity ($l_{opt} \rightarrow 1$ as the SNR$\rightarrow \infty$).

Alternate Embodiments Using the Linear Generic Embedding Function

Two alternate embodiments of the present invention use the linear approximation for the generic embedding function and modify the first and second linear embedding parameters. Each one of these embodiments may be important for some applications and help to tailor the present invention for a particular application.

One of these alternate embodiments simplifies the embedding process by choosing the second linear embedding parameter λ equal to one (λ=1). This choice simplifies embedding computations and increases efficiency of the embedding process. Another alternate embodiment includes also choosing the first linear embedding parameter equal to one (α=1). This choice further simplifies computation and increase efficiency of the embedding process because the amplitude of the unique and discrete mark can be absorbed by $s_u^2$.

Although the above alternate embodiments simplify computation and increase efficiency, these embodiments may introduce an additional weakness to the system. In particular, when the second linear embedding parameter equals one (λ=1), the influence of the original signal on the marked signal is completely removed. This information can be used by an attacker to reduce the search space needed to detect the unique and discrete mark. Another alternate embodiment of the present invention that uses the linear approximation for the generic embedding function address this concern by introducing a randomness in the second linear embedding parameter λ in order to remove the possibility of this attack on the marked signal. By introducing a small randomization in the second linear embedding parameter λ, the possibility of an attack on the marked signal is essentially removed.

Limited Distortion Embedding Technique

In general, existing spread spectrum techniques have a constant average distortion level. Embodiments of the spread spectrum embedding system of the present invention discussed above use a choice of the first and second linear embedding parameters (a and l) that guarantee the same level of average distortion as in existing spread spectrum techniques. The spread spectrum system and method of the present invention, however, does not have a constant average distortion level. In order to address this issue, the present invention includes an embodiment that limits the distortion to a desired maximum while maintaining the previously mentioned advantages of this spread spectrum system and method.

In particular, the limited distortion embodiment of the present invention provides improved performance and efficiency in detection of an embedded unique and discrete mark within a marked signal while removing the original signal x as a source of interference. By removing the influence of the original signal x from the detection, the distortion level may be limited while still providing improved detection performance. In addition, a desired distortion level may be selected in this limited distortion embodiment. This is accomplished by removing the influence of the original signal x from the detection only over a pre-defined range of the original signal x.

Limiting the distortion level does not necessarily affect an error detection rate of the mark. In fact, by introducing a limit on the distortion level, further improvement may be obtained in the error detection rate. In particular, by looking at extremes of the distortion in the spread spectrum system and method of the present invention it is noted that large values of distortion occur in two different situations. In one situation the sign of the influence of the original signal x is the same as the sign of the encoding bit b. If λx/αb>1, then the second linear embedding parameter λ has an effect of reducing the strength of the unique and discrete mark. In other words, by setting (αb−λx)=0 whenever λx/αb>1, the distortion can be made to equal zero and better error detection rates can be obtained because the mark will in fact be stronger.

In a second situation the influence of the original signal x and the encoding bit b have opposite signs and the presence of the original signal acts to reduce the energy of the unique and discrete mark. In this case, the second linear embedding parameter λ helps to restore the mark to an ideal level. In fact, if λ=1, the mark is always present at the same energy level, regardless of the value of x. As explained above, however, the choice of the second linear embedding parameter equal to one (λ=1) is not the optimum choice for every application. If the second linear embedding parameter is less than one (λ<1) then there will be a value of x above which the unique and discrete mark will not be correctly detected even in the absence of noise. More precisely, if $$\frac{x}{b} < \frac{-a}{(1-l)},$$

then there is erroneous detection of the mark even in the absence of noise. These are large values for the influence of the original signal x and therefore imply a large distortion level. Because the mark is not going to be detected anyway, setting distortion equal to zero (i.e., αb−λx=0) is generally the preferred choice.

Therefore, although previous embodiments have assumed an unbounded distortion model to simplify mathematical analysis, an embodiment that uses a bound for the second linear embedding parameter λ is used to produce a limited distortion embedding process. The choice of the second linear embedding parameter λ can be summarized as:

$$l = \begin{cases} l_0 & \text{if } -\frac{a}{(1-l_0)} < bx < \frac{a}{l_0} \\ \frac{ab}{x} & \text{otherwise} \end{cases}$$

where $l_0$ is the pre-computed value for the second linear embedding parameter λ as optimized by the previously described methods. It should be noted that this second choice for the second linear embedding parameter λ for when the original signal x is outside a given interval implies zero distortion. This embodiment may be seen as "giving up" whenever the original signal x is too large in the opposite direction of the encoding bit b, and allowing a stronger mark whenever the original signal x is too strong but in the same direction as the encoding bit b. In these cases, we do not transmit the mark because the distortion necessary to allow reception would be too high (as in the first case), or because the mark will be correctly detected even if it is not transmitted (as in the second case).

Even though the error detection rate may be improved by introducing a limit on the distortion level as described above, one disadvantage is that this limit is not under our control and the limit depends only on the values established for the first and second linear embedding parameters (α and λ). In a preferred embodiment of the present invention, distortion is limited to a desired level by introducing a window function to strictly control the limit of distortion. In this way, distortion is limited to a certain desired level.

The present invention includes a preferred embodiment that permits a desired distortion level to be selected. This is achieved in part by defining a window function w to limit a region where the unique and discrete mark may be introduced. This may be expressed mathematically by:

$$s = x + w(x,b)(ab - lx)u,$$

where $$w(x, b) = \begin{cases} 0 & \text{if } bx > a/l \\ 0 & \text{if } bx < -K \\ 1 & \text{otherwise} \end{cases}$$

The term K is known as a termination parameter because it defines a region outside of which the mark is not introduced and is the process is terminated. The first zero in the window function w corresponds to a case where the mark is correctly detected even without inserting any additional signal, implying that there is not need to increase distortion. The second zero corresponds to a termination case. Specifically, if the original signal x is too strong and in the wrong direction, the process is terminated and an error is allowed to occur. This allows this embodiment to guarantee a maximum distortion.

A new expected distortion may be computed as:

$$E[D] = E[\|s - x\|] = E[w^2(x, b)|ab - 1x|^2 s_u^2] = s_u^2 \int_{-K}^{a} (a^2 + 1^2 x^2) p(x) dx$$

The above equation illustrates that in order to have the same distortion level D as existing spread spectrum techniques, the last integral should be equal to one. A simpler approach is to obtain an upper bound by extending the integrals to infinity. This makes the distortion level D approximately the same as for existing spread spectrum techniques, meaning that the distortion level D can be guaranteed (i.e., $E[D] < s_u^2$) by making:

$$a = \sqrt{\frac{Ns_u^2 - 1^2 s_x^2}{Ns_u^2}}.$$

In this case, an error probability p will be:

$$p = Pr\{\hat{b} < 0 | b = 1\} = Pr\{(x+m(x)(a-1x)+n < 0)\} \leq Pr\{x < -K\} + Pr\{-n > a + (1-1)x | x \leq -K\} Pr\{x \leq -K\}$$

The second linear embedding parameter may be set equal to one ($\lambda = 1$) in order to simplify analysis. In this situation the error probability becomes:

$$p \leq Pr\{x < -K\} + Pr\{n > a\} Pr\{x \geq -K\},$$

while for existing spread spectrum techniques the error probability is:

$$p \approx Pr\{x < -K\} + Pr\{n > l+x\} Pr\{x \geq -K\}$$

Therefore, the limited distortion embodiment of the present invention allows a distortion level to be limited while still providing improved detection (i.e., lower error probability) over existing spread spectrum techniques. This is accomplished by removing the influence of the original signal x from the detection. In addition, the limited distortion embodiment of the present invention allows a desired distortion level to be selected by removing the influence of the original signal x only over a pre-defined range.

Non-Linear Generic Embedding Function

In a preferred embodiment the present invention does not restrict the generic embedding function $\mu(x,b)$ to a linear approximation. This optimal case is more complex and more generic that the linear approximation embodiment. Where the generic embedding function $\mu(x,b)$ is not restricted to be linear, the marked signal s can be expressed as:

$$s = x + m(x,b)u.$$

As before, the goal is to find the optimum solution for the generic embedding function $\mu(x,b)$ that minimizes the error of the detected encoding bit. One way to simplify the above equation is to note that since the original signal x, the noise n, and the encoding bit b are independent, the generic embedding function $\mu(x,b)$ will be odd symmetric. This means that $\mu(x,b) = -\mu(-x,-b)$. Thus, for simplicity, the assumption may be made that the encoding bit b=1 such that the embedding function is only a function of x. The generic embedding function may be written as $\mu(x)$ and the marked signal s may be expressed as:

$$s = x + m(x)u.$$

The distortion for a certain value of x is:

$$d(x) = (m(x))^2 s_u^2.$$

And, as before, the sufficient statistic r (computed from y=s+n) may be represented as:

$$r(x) = x + m(x) + n.$$

The goal is to determine the generic embedding function $\mu(x)$ that minimizes an expected detection error probability, $p = E\{pe(x)\}$, for a given expected distortion $D = E\{d(x)\}$. The first step is to compute pe(x) as:

$$pe(x) = Pr\{r < 0\}$$
$$= Pr\{(x + m(x) + n) < 0\}$$
$$= Pr\{n > x + m(x)\}$$
$$= \frac{1}{2}\text{erfc}\left(\frac{x + m(x)}{S_n \sqrt{2}}\right)$$

In order to be the optimum generic embedding function, $\mu(x)$ must be such that it satisfies:

$$\frac{\partial}{\partial d} pe(x) = K'$$

for some constant K'. Therefore an optimum solution $\mu(x)$ should satisfy the equation:

$$\begin{cases} \frac{\partial}{\partial m} d(x) = 0, & \text{or} \\ \frac{\frac{\partial}{\partial m} pe(x)}{\frac{\partial}{\partial m} d(x)} = K' \end{cases}$$

Because d(x) is simply the (scaled) square of $\mu(x)$, the first condition is satisfied only for $\mu(x) = 0$. The second condition can be rewritten as:

$$\Rightarrow \frac{\frac{\partial}{\partial m}\text{erfc}\left(\frac{x+m(x)}{s_n\sqrt{2}}\right)}{2m(x)} = K' \Rightarrow$$

$$\Rightarrow e^{-\left(\frac{x+m(x)}{s_n\sqrt{2}}\right)^2} = Km(x),$$

where K is a different constant. There is, unfortunately, no closed form solution for $\mu(x)$ and the above equation must be solved numerically.

Figure 7:
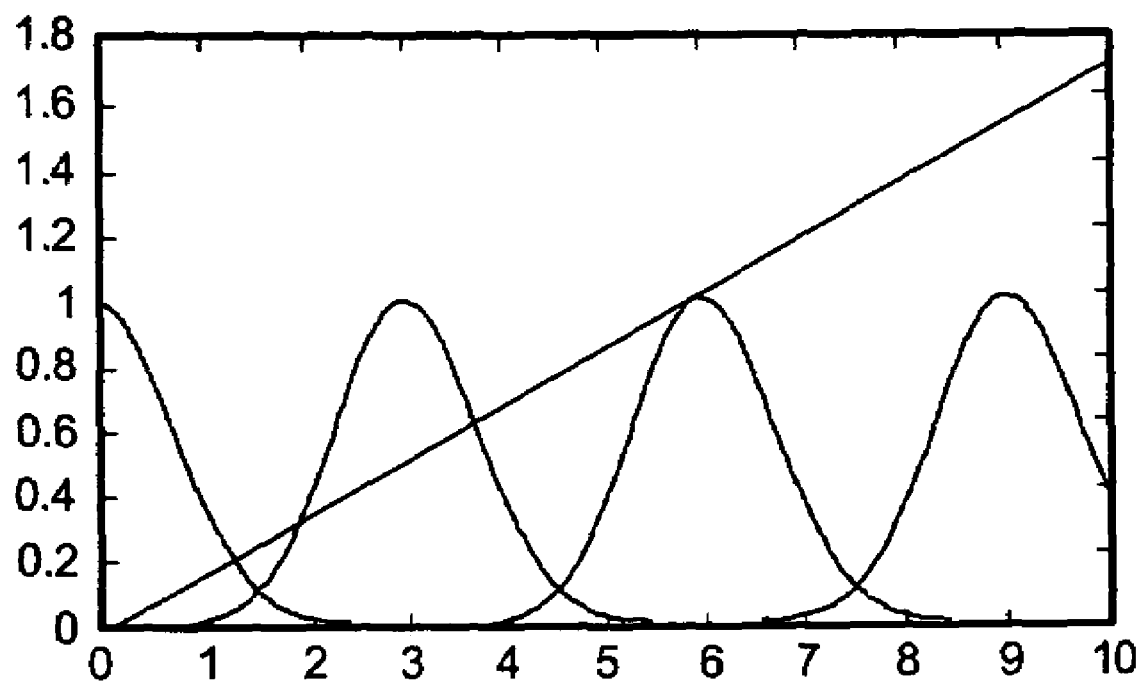
FIG. 7 is a plot illustrating a method of the present invention for solving for the optimum generic embedding function.

A numerical solution for $\mu(x)$ can be found by first noting that the expected error probability depends on the variance of the noise, and on the constant K. Therefore, the constant K may be used as a parameter that will determine a final balance between distortion and error probability. Depending on the values of K, $s_n$, and x, the equation will have one, two or three solutions, one of which is the optimum value of $\mu$ (remember the equation is only a necessary condition). FIG. 7 illustrates these three different cases. In particular, FIG. 7 shows a plot of the right side of the equation (a straight line) for a certain K and the left side of the equation (a normal curve) for four different values of x (namely, x=0, -3, -6, and -9). If positive values of x are used, the peak of curve will be offset to the left.

A solution (the optimal generic embedding function for the given value of x) is one of the points where the normal curve intersects the line. For positive values of x the only intersection point must be chosen. However, as the value of x becomes more and more negative (i.e., as the normal curve is offset more to the right) there will be two extra intersection points, both lying to the left of the peak. The middle intersection point may be discarded due to an increase in distortion and an increase in error probability that choice brings. In order to decide between a first and a third point, a ratio between the difference in error probability and the difference in distortion at each point is computed.

Graphically, this can be interpreted as balancing the areas between the straight and the normal curves. In other words, the point closest to the origin is selected whenever the area between the curves from this point to the second intersection point (i.e., the area in which the normal curve is below the straight line) is higher than the area between the curves from the second to the third intersection points (i.e., the area in which the normal curve is above the straight line). Otherwise, the third intersection point is selected. In this way, an optimal generic embedding function $\mu(x)$ is found numerically.

Redundant Bit Representation

In many situations the embedding system and method of the present invention may be used to embed the same mark in several different original signals. This may occur, for example, in the case where a manufacturer's mark is being embedded into several different songs. One problem with this situation is that, if an attacker gains access to several of these marked signals, the marked signals may be averaged and the mark may be detected through this averaging. Because the mark is the same for all of the different original signals but the carrier signal is independent, the mark will stand out and become easy to detect. All the attacker needs to have is enough signals having the same mark and this collusion attack can be used to detect the mark.

Several techniques exist for attenuating this collusion attack problem. For example, one technique randomizes the starting point of the mark insertion into the original signal. However, this requires a decoder to search for the starting point and therefore significantly increasing computational complexity. Other techniques currently used to mitigate the collusion attack problem also involve generally complex computational analysis for decoding.

The present invention addresses this problem by using a redundant bit representation. In particular, this redundant bit representation is implemented so that a resulting average of marks tends to zero when several original signals are averaged together. Many possible implementation of redundant bit representation may be used for this purpose and will achieve similar results such that the averaging of several original signals together will result in the average of marks tending to zero.

A preferred embodiment of the present invention inserts an "invert" bit into the embedding process. This invert bit, which has 50% probability, indicates the need to invert any remaining bits. For example, if a original sequence of bits 0110101 needs to be inserted, then this original sequence is mapped into two bit sequences: 00110101 and 11001010. Each of these two bit sequences is used in approximately half the original signals to be marked.

Because each one of these two sequences is the exact opposite of the other one, if an attacker average several marked signals together, the mark will not add constructively as before and will virtually eliminate this as a source of attack. More specifically, if N bits ($b_1b_2b_3 \ldots b_N$) are to be transmitted, then the present invention transmits N+1 bits ($a_0a_1a_2a_3 \ldots a_N$). In this embodiment, $a_0$ is a random bit (with equal probability), and $a_i = b_i$ XOR'$a_0$, for i=1, ... N. It should be noted that several implementations of redundant representation can be used to reduce collusion attacks and will achieve similar results.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for embedding information within a media, comprising:
   estimating interference of an original signal within the media with an information signal being embedded;
   modulating a strength of the information signal being embedded into the original signal to compensate for the estimated interference of the original signal so as to minimize the probability that the information signal cannot be detected, wherein said modulating is accomplished via spread spectrum modulation using an embedding function, and wherein an optimal solution for the embedding function is determined that approximately minimizes a probability of error in detection of an encoded bit; and
   embedding the strength-modulated information signal into the original signal.

2. The method of claim 1, wherein the information is a spread spectrum sequence.

3. The method of claim 2, wherein the spread spectrum sequence is pseudo random.

4. The method of claim 1, wherein the embedding function is approximated by a linear function.

5. The method of claim 1, wherein the embedding function is a nonlinear function.

6. A method for a redundant representation of bits within marked signals each containing an original signal and an embedded information signal, comprising:

embedding a non-inverted information signal into the original signal of approximately one-half of the marked signals; and embedding an inverted information signal into the original signal of the remaining marked signals, thereby causing an average of the embedded information signals to tend toward zero when the marked signals containing the embedded information signals are averaged together.

7. A method for embedding information in analog or digital media, comprising:

receiving an original signal;

applying a transformation to the received signal;

estimating an interference the original signal would cause with an information signal being embedded therein which would be detrimental to the detection of the information signal once embedded in the original signal;

modulating a strength of the information signal being embedded into the original signal to compensate for the estimated interference of the original signal;

embedding the strength-modulated information signal into the original signal to produce a marked signal; and applying the reverse of said transformation to the marked signal.

8. The method of claim 7, wherein applying the transformation includes converting the original signal to a domain more appropriate to information embedding.

9. The method of claim 7, wherein modulating the strength of the information signal includes using a generic embedding function that approximately minimizes an error in detection of the embedded information signal in the original signal.

10. The method of claim 9, wherein the embedding function is approximated by a linear function.

11. The method of claim 9, wherein the embedding function is a nonlinear function.

12. The method of claim 7, wherein the interference is estimated only over a pre-defined range.

13. The method of claim 12, wherein a window function is established to define the pre-defined range in which the embedded information may be embedded within the original signal.

14. The method of claim 7, wherein the information is a spread spectrum sequence.

15. The method of claim 14, wherein the spread spectrum sequence is pseudo random.

* * * * *